United States Patent

Im

Patent Number: 5,401,437
Date of Patent: Mar. 28, 1995

[54] POLYMER DISPERSED LIQUID CRYSTAL FOR WIDE VIEWING ANGLE

[75] Inventor: Seoung J. Im, Seoul, Rep. of Korea

[73] Assignee: Samsung Electron Devices Co., Ltd., Kyunggi-do, Rep. of Korea

[21] Appl. No.: 113,458

[22] Filed: Aug. 27, 1993

[30] Foreign Application Priority Data

Jan. 29, 1993 [KR] Rep. of Korea .............. 93-1097

[51] Int. Cl.$^6$ .............. C09K 19/52; C09K 19/12; G02F 1/13
[52] U.S. Cl. .............. 252/299.01; 252/299.61; 252/299.63; 252/299.64; 252/299.65; 252/299.66; 359/51; 359/52; 359/103; 359/105; 359/106
[58] Field of Search .............. 252/299.01, 299.61, 252/299.63, 299.64, 299.65, 299.66; 359/51, 52, 103, 105, 106

[56] References Cited

U.S. PATENT DOCUMENTS

| | | | |
|---|---|---|---|
| 4,435,047 | 3/1984 | Fergason | 350/334 |
| 4,685,771 | 8/1987 | West et al. | 350/347 V |
| 4,688,900 | 8/1987 | Doane et al. | 350/347 V |
| 4,994,204 | 2/1991 | Doane et al. | 252/299.01 |
| 5,178,710 | 1/1993 | Hikmet et al. | 156/272.2 |
| 5,204,673 | 4/1993 | Hikmet | 359/51 |
| 5,210,630 | 5/1993 | Heynderickx et al. | 359/106 |
| 5,240,636 | 8/1993 | Doane et al. | 252/299.01 |

FOREIGN PATENT DOCUMENTS 1-198725 8/1989 Japan.
8909807 4/1989 WIPO.

*Primary Examiner*—Shean Wu
*Attorney, Agent, or Firm*—Saliwanchik & Saliwanchik

[57] ABSTRACT

The polymer dispersed liquid crystal according to the present invention comprises about 5 to about 40% by weight of liquid crystal mixture and about 60 to about 95% by weight of polymer, the polymer consisting of 1 to 40% by weight of oligomer and monomer having acrylate group(s), and 0.1 to 20% by weight of monomer of the following structural formula similar to the structure of the liquid crystal, and the liquid crystal mixture consisting of 0 to 20% by weight of cholesteric liquid crystal and 50 to 98% by weight of nematic liquid crystal as based on the total weight of the material.

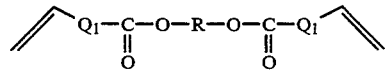

The polymer dispersed liquid crystal is capable of providing a wider viewing angle and an improved visual contrast and does not require treatment to orientation. Furthermore, the electrically switched liquid crystal display including it therein makes use of light more efficiently because polarizer is unnecessary any more, and may be produced by a simple process because no orientation (rubbing) treatment is required.

3 Claims, 3 Drawing Sheets

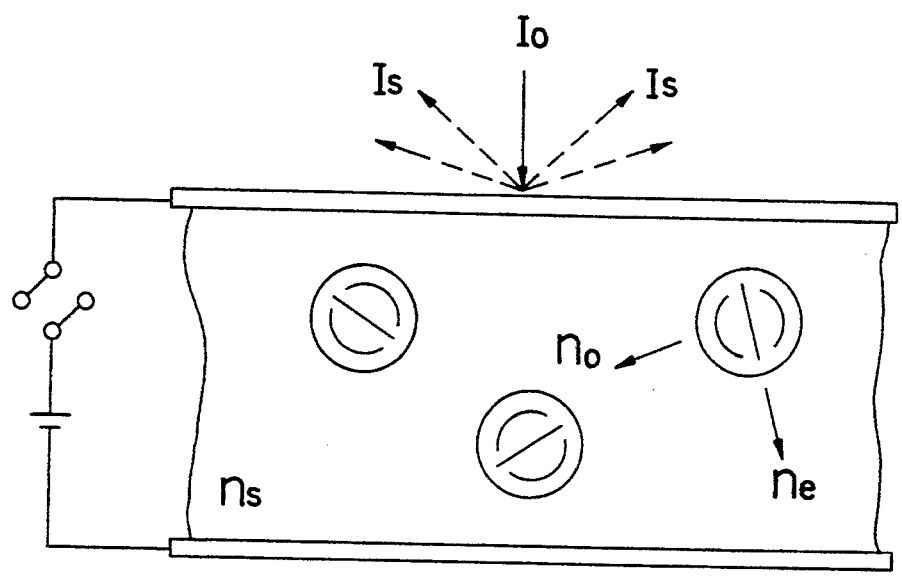
FIG. IA
(PRIOR ART)
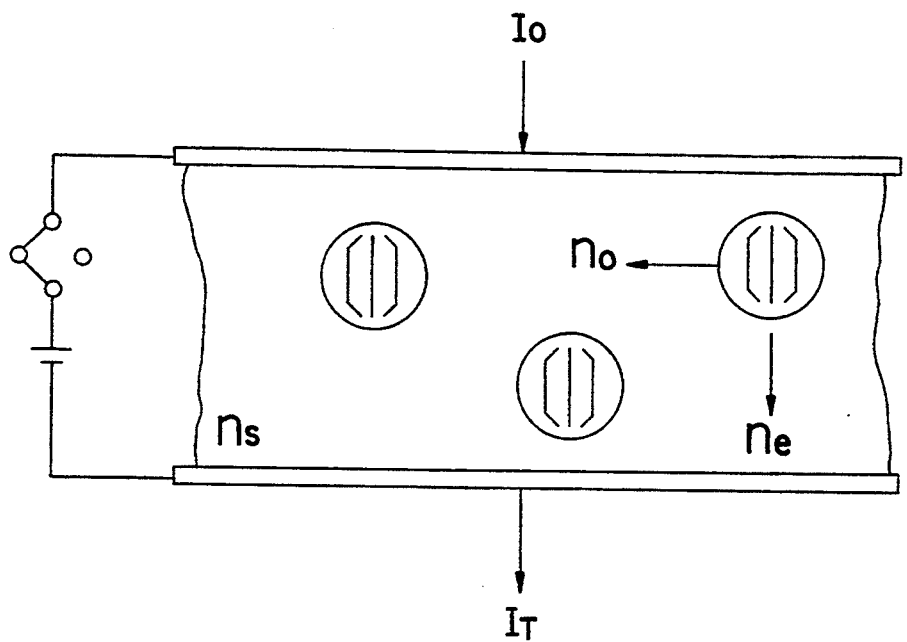
FIG. IB
(PRIOR ART)

POLYMER DISPERSED LIQUID CRYSTAL FOR WIDE VIEWING ANGLE

BACKGROUND OF THE INVENTION

1. Field of the Invention

The present invention relates to a liquid crystal light modulating material and, more particularly, to novel polymer dispersed liquid crystal for wide viewing angle.

2. Description of the Prior Art

In dependence on using a polarization screen, twisted nematic (TN) or super twisted nematic (STN) liquid crystals, chiefly used in conventional liquid crystal displays, have low use efficiency of light and need a surface orientation that becomes difficult around thin film transistors (TFTs) at high density of pixels. Furthermore, they have a small viewing angle range of ±20°. To solve these problems, there have been recently proposed network liquid crystal (PNLC) of light scattering mode, which are liquid crystal materials dispersed in a polymeric matrix.

Incident light may be scattered when no electric field is applied by electrodes across the liquid crystal material, polymer-dispersed liquid crystal (PDLC), so that the cell comprising PDLC is opaque in appearance because the refractive indices of the liquid crystal and the polymer in PDLC are mismatched. The incident light may be transmitted through PDLC in the state of field-ON, that is, when an electric field is applied thereacross, so that cells comprising PDLC are transparent in appearance because the refractive indices of the liquid crystal and the polymer in PDLC are matched to allow PDLC to be aligned parallel to the electric field. This principle makes it possible to provide a switchable display employing no polarization screen. Though PDLC is superior to TN or STN in terms of the use efficiency of light and the viewing angle, the refractive index mismatching in PDLC may be excessive in the field-ON state, thereby giving rise to increasing haze and decreasing contrast, depending on view direction. Thus, for the purpose of actual application of PDLC to switchable windows or direct visible displays, it is required for the viewing angle to be widened.

A polarization screen, which has been used in a conventional liquid crystal display utilizing TN or STN liquid crystals exhibits low use efficiency of light and thus, contrast is lowered. Every effort has been made to apply to a visual display a method wherein a light transmission and scattering mode is utilized without using polarized light. Among these efforts, first issued was U.S. Pat. No. 4,435,047, which suggested a method in which liquid crystals were dispersed in transparent polymer. The method described in the above-mentioned patent comprises mixing liquid crystals with an aqueous solution of polyvinyl alcohol homogeneously to form an emulsion, casting the emulsion in a uniform thickness of 10 to 20 μm on a glass slide or a polyester film which is pre-coated with indium tin oxide (ITO), a conductible material, vaporizing the water from the emulsion, and then laying a second polyester film or glass layer on the emulsion which has been cast on the first such that the emulsion is therebetween.

Another more developed method for the production of PDLC is described in U.S. Pat. Nos. 4,688,900 and 4,685,771. It is a phase separation method utilizing the solubility difference of polymer and liquid crystal monomer used in this method. As described, a matrix-providing composition containing liquid crystal, and monomer or oligomer of transparent resin, e.g., uncured epoxy, is polymerized by heat or UV light to yield microdroplets of liquid crystal in a thermoplastic or thermoset polymeric epoxy resin because as it polymerizes, the solubility of liquid crystal is decreased.

Assume that $n_s$ is the refractive index of transparent polymer resin, $n_o$ is the ordinary refractive index of a liquid crystal material, and $n_e$ is the extraordinary refractive index. When an electric field is not applied across the liquid crystal material, the refractive indices of $n_e$ and $n_s$ are not matched, as shown in FIG. 1A, so that incident light is scattered, and thus film sheets containing the liquid crystal material therebetween are opaque in appearance. On the other hand, as shown in FIG. 1B, when an electric field is applied, the refractive indices of $n_e$ and $n_s$ are matched so that the liquid crystal material is aligned parallel to the field. Accordingly, incident light is transmitted, and thus the film sheets appear transparent. Such principles result in the effect that the film seems to become widened, so as to be utilized as switchable windows, and that the film allows a screen constituted thereby to be brightened, so as to be utilized as a projection display or a direct visible display. Also, the liquid crystal materials which are utilized according to such principles are superior in viewing angle and response time to TN or STN liquid crystals. The viewing angle, however, is restricted to ±45° because in the state of field-ON, the structural difference of the polymer and the liquid crystal in PDLC makes the $n_s$ and $n_o$ for incident light mismatched at an oblique angle.

In PNLC, polymeric matrix has a structure of three-dimensional crosslinked network and liquid crystal has a continuous phase, whereas in PDLC, polymeric matrix has a continuous phase and liquid crystal is formed into droplets. PNLC is less dependent on the refractive indices of polymeric matrix and liquid crystal and has a wider viewing angle than PDLC, the operative principle of which is different from that of PNLC in the aspect of the dependence on the refractive indices (Japanese Patent Laid-Open No. Hei. 01-198725). Even PNLC has a limitation of viewing angle because transparency decreases at increasing oblique angles, giving rise to increasing haze until an essentially opaque appearance is detected at an oblique-enough angle.

As shown in FIG. 2, a process for the production of polymer-dispersed liquid crystal material which comprises an anisotropic, birefringent polymeric matrix having units attached as pendants to the main chain of the polymer, the structure of which is similar to that of liquid crystal monomer, is disclosed in International Patent No. WO89/09807 (incorporated herein by reference). The polymer-dispersed liquid crystal material is made in such a manner that the ordinary refractive index $n_o'$ and the extraordinary refractive index $n_e'$ of the liquid crystal are selected to have values identical to the ordinary refractive index $n_o'$ and the extraordinary refractive index $n_e'$ of the polymer, respectively. This allows the refractive indices of the polymer and the liquid crystal to be identical at all viewing angles in the presence of an applied electric field so as to widen the effective viewing angle. The birefringent polymeric matrix, however, is difficult to synthesize in a manner as mentioned above. Moreover, the polymeric matrix is compatible with the liquid crystal monomers well, so that the phase separation of the polymeric matrix from the liquid crystal monomers may not be carded out easily, and the viewing angle becomes narrow in the presence of various liquid crystal monomers which have different structures from one another.

A polymer-dispersed liquid crystal material which had wide viewing angle by making use of the focal conic texture and bi-stability of cholesteric liquid crystal was reported by Institute of Electrical and Electronics Engineers, 1991. It employs a helix structure which is constructed when the cholesteric liquid crystal is placed between two glass sheets bearing indium tin oxide, rubbed with rubbing material, e.g., polyimide or the like. By this orientation treatment, the pitch of the helix is thus controlled to be identical to a wavelength of infrared ray range, so that reflection or scattering does not occur at the range of visible light wavelength. In the absence of an applied electric field, the polymer-dispersed liquid crystal materials are textured to be planar due to the effect of surface orientation according to the helix structure, so as to be transmissive to incident light whereas in the presence of a field, the effect disappears to make the polymer dispersed liquid crystal materials have focal conic textures, which is maximized in entropy, so that incident light is scattered. However, there are disadvantages of a poor visual contrast and requirements of a high operating voltage and an orientation treatment.

BRIEF SUMMARY OF THE INVENTION

For solving the problems above stated, the present inventors have recognized that there exists a need for a novel material that is capable of providing wide viewing angle and high visual contrast.

Accordingly, in one aspect of the present invention, there is provided a polymer-dispersed liquid crystal material which can advantageously provide a wide viewing angle and improve visual contrast for a visual display or a screen without need of a high operating voltage.

According to another aspect of the present invention, there is provided a polymer-dispersed liquid crystal material capable of eliminating the orientation treatment and thus making easy the manufacture of electrically switched liquid crystal display devices.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWINGS

FIG. 1A is a fragmentary, schematic illustration in cross-section of a conventional PDLC in the absence of an applied electric field.

FIG. 1B is a fragmentary, schematic illustration in cross-section of a conventional PDLC in the presence of an applied electric field.

DETAILED DESCRIPTION OF THE INVENTION

Figure 2:
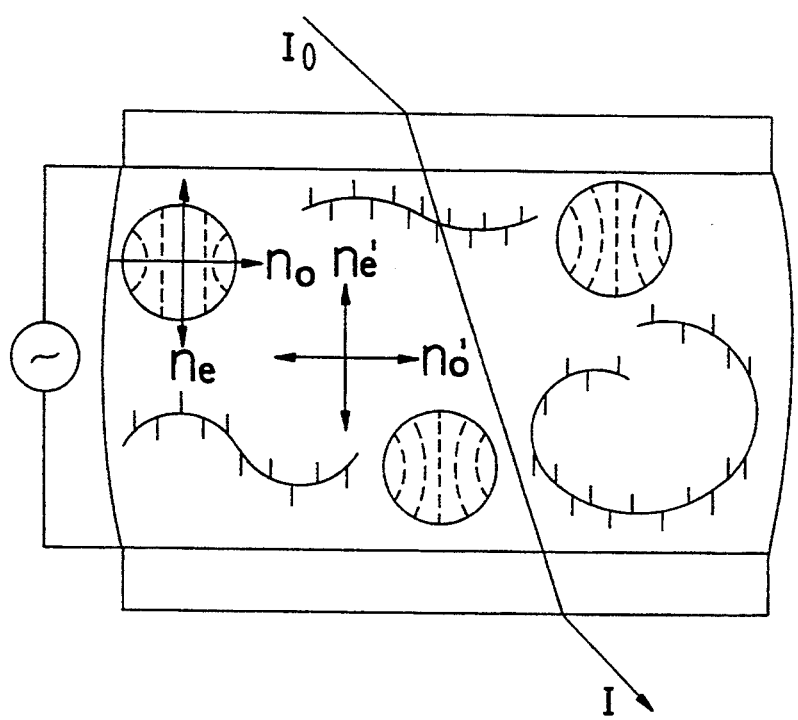
FIG. 2 is a fragmentary, schematic illustration in cross-section of a conventional PDLC making use of birefringent polymer for wide viewing angle.

In an embodiment of the present invention, an electrically switched liquid crystal display device includes a composition as a light modulating liquid crystal material that comprises about 5 to 40% by weight of liquid crystal mixture, about 60 to 95% by weight of polymer, and a desired amount of UV polymerizing initiator which are dispersed between electrodes of, for example, indium tin oxide that are deposited for support on respective mounting or confining substrates such as glass, plastic sheets, or the like, the polymer comprising oligomer and monomer having acrylate group(s), crosslinking agent, and monomer of the following structural formula (I) similar to the structure of liquid crystal, and the liquid crystal mixture comprising cholesteric liquid crystal and nematic liquid crystal.

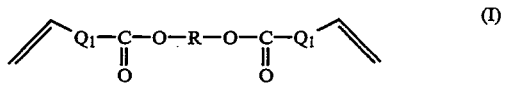

wherein $Q_1$ is selected from the group consisting of

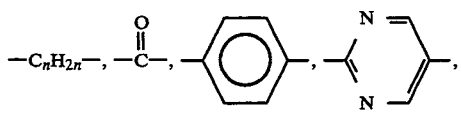

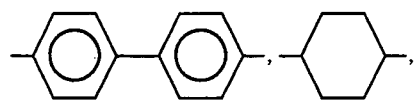

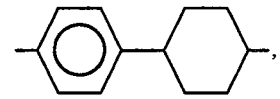

or derivatives thereof,
R is selected from the group consisting of

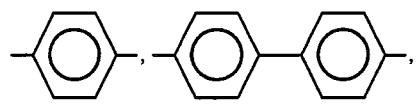

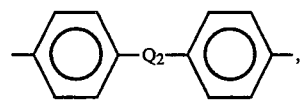

or derivatives thereof,
wherein $Q_2$ is selected from the group consisting of

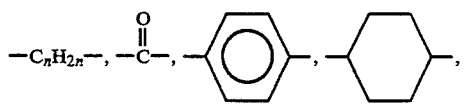

or derivatives thereof, and n is an integer of 1 to 10.

The acrylate used in the present invention is a monomer-oligomer system comprising monomer, oligomer, and crosslinking agent, and may be used in a proper amount to express a desirable property by routine optimization which is well within the skill of the ordinarily skilled artisan in view of these teachings. For example, if too much polymer is used, operating voltage is necessitated to be high, and visual contrast becomes lowered. On the other hand, if too little polymer is used, a viewing angle becomes narrowed. Thus, the amount of the polymer is on the order of from about 1 to about 40% by weight as based on the total weight of the composition including liquid crystal monomers, preferably about 3 to 30% by weight, more preferably about 5 to 20% by weight.

The monomer of the above structural formula (I) may be prepared according to the following reaction scheme:

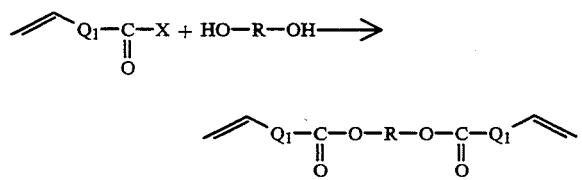

wherein $Q_1$, R, $Q_2$, and n are the same as set forth above, and X is selected from the group consisting of F, Cl, Br, and I.

The monomer of the above structural formula (I) contains double bonds on both end sides thereof that are capable of being cured by UV. The amount of this monomer is preferably on the order of from about 0.1 to about 40% by weight as based on that of the acrylate polymer, more preferably about 0.5 to about 20% by weight, and most preferably about 1 to about 10% by weight. When as based on the total amount of the composition including liquid crystal materials, the amount of the monomer is preferably on the order of from about 0.1 to about 20% by weight, more preferably about 0.3 to about 10% by weight, and most preferably about 0.5 to about 5% by weight. For example, if the amount becomes large, viewing angle becomes widened, but a high operating voltage is necessitated, and visual contrast becomes lowered. On the other hand, if the amount is below the range, viewing angle becomes narrow. The weight ratio between the acrylate compound of monomer oligomer system and the monomer of the structural formula (I) is preferred to be in a range of about 99:1 to about 80:20.

The cholesteric liquid crystal used in the present invention generally is in a category of steroid type and chiral nematic type, that is, optically active nematic type. The pitch length in the helix structure of the cholesteric liquid crystal, which relates to the scattering and transmission of visual light, is dependent on the amount of the chiral dopant, that is, cholesteric liquid crystal itself, which is added to the nematic liquid crystal included in the liquid crystal mixture, and is in inverse proportion to the amount of the added chiral dopant if the helical twisting power is fixed. That is, $k \cdot HTP = 1/pc$ wherein k is a constant, HTP means helical twisting power, p is a pitch length of the helix, and c is the concentration of cholesteric liquid crystal added to nematic liquid crystal. The steroid type cholesteric liquid crystal has not been much utilized recently. In the present invention, the chiral nematic liquid crystals are mainly utilized to control the pitch length. Generally, the larger the mount of the cholesteric liquid, the shorter becomes the pitch length, so that the scattering of incident light becomes increased and the visual contrast in an early state becomes improved. However, there occur such disadvantages that hysteresis becomes large, and a high voltage becomes necessitated for reaching a homeotropic state. Thus, the amount of cholesteric liquid crystal is preferably on the order of from about 0 to about 20% by weight, more preferably about 0 to about 15% by weight, and most preferably about 0 to about 10% by weight.

The nematic liquid crystal used in the present invention is in liquid crystalline phase which is capable of dissolving the chiral dopant of solid or liquid state. The amount of the nematic liquid crystal used is preferably on the order of from about 50 to about 98% by weight, more preferably about 65 to about 95% by weight, and most preferably about 70 to about 90% by weight.

Figure 3A:
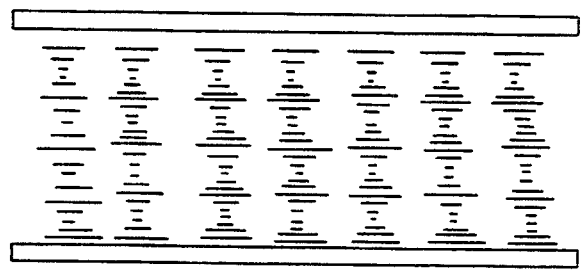
FIG. 3A is a fragmentary, schematic illustration in cross-section of a planar texture of the light modulating liquid crystal material according to the present invention.
Figure 3B:
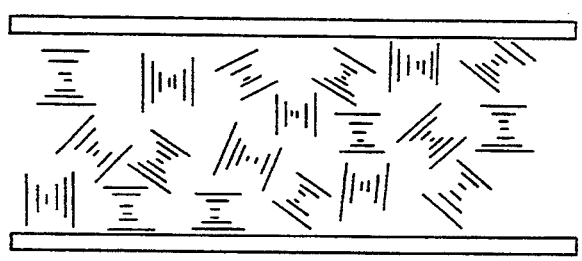
FIG. 3B is a fragmentary, schematic illustration in cross-section of focal conic texture of the light modulating liquid crystal material according to the present invention.
Figure 3C:
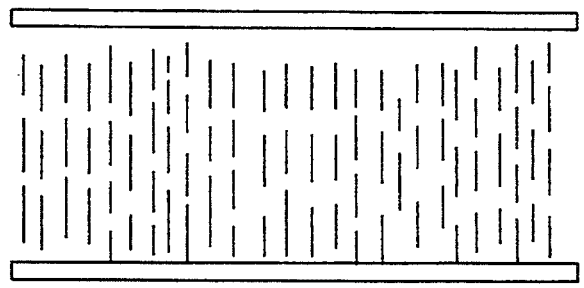
FIG. 3C is a fragmentary, schematic illustration in cross-section of homeotropic texture of the light modulating liquid crystal material according to the present invention.

In general, the phase transition mode of cholesteric to nematic state appears in three forms as shown in FIGS. 3A and 3B. First, FIG. 3A shows a planar texture which is oriented orthogonal to the surface of a cell. Second, FIG. 3B shows a focal conic texture, in which an orienting power for the helix structure gets relieved. Finally, a homeotropic texture is shown in FIG. 3A, in which the helix is untwisted. In the planar texture, if incident light is orthogonal to the surface of the cell, a wave is reflected the length of which follows the formula $\lambda = np$, wherein $\lambda$ is a reflective wavelength, n is the average refractive index of liquid crystal mixture, and p is a pitch length. For example, if the average index of the liquid crystal mixture and the pitch length are controlled to be 1.5 and 350 nm (0.35 $\mu$m), respectively, the cell reflects the wave with 525 nm of wavelength that corresponds to a green ray. On the other hand, if the pitch length is controlled more lengthy in order to make the reflective wave, $\lambda$, have a wavelength of infrared range, no reflection or scattering of light in a visual range occurs, so that the cell in the planar texture is transparent in appearance. At this time, the application of an electric field to the cell allows the planar texture to experience a phase transition into such a focal conic texture that the cell is opaque in appearance, which is transferred to the homeotropic texture by a greater applied field such as to untwist the helix therein.

According to such principle, an electrically switched liquid crystal device including cholesteric liquid crystal makes use of the bi-stability of planar texture and focal conic texture so that it may be utilized as a visual display operated with a simple matrix, or a device making use of a reflective wavelength controlled to infrared range that may be utilized as a light shutter of reverse mode for a wide viewing angle. Such cases, however, need glass sheets bearing indium tin oxide electrode rubbed with, for example, polyimide, which can remove the advantage according to the present invention that the rubbing (orientation) treatment is not necessary in PDLC. In addition, the disadvantage that visual contrast is lowered to 10 also occurs in such cases.

The liquid crystal light modulating material produced in accordance with the present invention is sealed in a device not requiring the orientation treatment so that it exists in two states of focal conic texture (scattering mode) and homeotropic texture (transmission mode).

The liquid crystal light modulating material according to the present invention is pipetted with a spacer into cells being spaced 5 to 20 μm from one another, and then is cured by UV light to be of focal conic texture, in which the cells appear transparent. On applying an electric field into the cells containing the liquid crystal light modulating material of focal conic texture therein, the liquid crystal light modulating material becomes of homeotropic texture in which the cells become opaque in appearance.

The light modulating liquid crystal material according to the present invention is different from conventional twisted nematic or super twisted nematic liquid crystal in the fact that the use of a polarizer is not necessary so that light is utilized more efficiently. Moreover, in spite of using cholesteric liquid crystal, the device containing the present light modulating material does not require orientation treatment so that the process for the production of it is relatively simple. Furthermore, the present polymer system which is prepared by polymerizing the oligomer and monomer having an acrylate group and the monomer having a structure similar to the liquid crystals used enables wider viewing angles than conventional PDLC and PNLC and, thus, the light modulating liquid crystal material containing liquid crystal therewith is very useful to a switchable window and a direct visible display.

The present invention is further illustrated with reference to the following examples, these being indicative, however, of but a few of the various changes and modifications in which the principle of this invention and improvement may be employed.

EXAMPLE 1

Ninety percent by weight of a blend that comprises the oligomer and monomer having an acrylate group and a crosslinking agent having multifunctional group was added to 10% by weight of a blend that comprises lab-synthetic polymer having a structure similar to the following liquid crystals and 4,4'-biphenyl diacrylate to prepare a polymer system. Then, 95% by weight of E-7 (available from E. Merck Company) utilized as nematic liquid crystal and 5% by weight of CB-15 (Merck) utilized as chiral nematic liquid crystal were admixed to prepare a liquid crystal mixture. Ninety percent by weight of the liquid crystal mixture was dissolved homogeneously in 10% by weight of the polymer system in combination with a UV initiator and 0.03% by weight of diethoxyacetophenone as based on the weight of the polymer system to prepare a homogenous liquid crystal polymer solution, which had a lower clearing temperature (Tc), 47° C., than the Tc of E-7, 61° C. The homogeneous solution was pipetted in a uniform layer over 7 μm spacer between two indium tin oxide conducting electrode-bearing glass sheets which had 86% of transmission rate and 30 Ω/□ of area resistance. After pipetting, the solution was cured by exposing UV light with 365 nm of wavelength at a magnitude of 5 mW/cm² for 5 minutes to produce a cell.

The ratios by weight of the materials used in this Example are given in following Table 1.

The electro-optic properties and viewing angle of the cell was measured, the viewing angle being represented as an angle between points of 40% of light transmission rate.

Their results are given as following Table 2.

EXAMPLE 2

A cell was produced in a manner similar to Example 1 except that only nematic liquid crystal, as shown in Table 1, was used as a liquid crystal material instead of the mixture of cholesteric and nematic liquid crystal.

The electro-optic properties and viewing angle of the cell were measured.

Their results are given as following Table 2.

EXAMPLE 3

A cell was produced in a manner similar to Example 1 except that the quantity of the polymer having a structure similar to liquid crystals was changed as shown in Table 1.

The electro-optic properties and viewing angle of the cell were measured.

Their results are given as following Table 2.

EXAMPLE 4

A cell was produced in a manner similar to Example 2 except that the quantity of the polymer having a structure similar to liquid crystals was changed as shown in Table 1.

The electro-optic properties and viewing angle of the cell were measured.

Their results are given as following Table 2.

EXAMPLES 5-8

Cells were produced in manners similar to Examples 1-4, respectively, except that the ratio by weight of polymer system and liquid crystal mixture was changed as shown in Table 1.

The electro-optic properties and viewing angle of the cells were measured.

Their results are given as following Table 2.

Comparative Example 1 (C. Example 1)

A cell was produced in a manner similar to Example 1 except that the ratios of the materials used are in this Example changed as shown in Table 1.

The electro-optic properties and viewing angle of the cell were measured.

Their results are given as following Table 2.

Comparative Example 2 (C. Example 2)

A cell was produced in a manner similar to Example 1 except that the ratios of the materials used are in this Example changed as shown in Table 1.

The electro-optic properties and viewing angle of the cell were measured.

Their results are given as following Table 2.

TABLE 1

| Composition | Liquid Crystal: Polymer (wt %) | Acrylate: BPD* (wt %) | E-7:CB-15 (wt %) |
|---|---|---|---|
| Example 1 | 90:10 | 90:10 | 95:5 |
| Example 2 | 90:10 | 90:10 | 100:0 |
| Example 3 | 90:10 | 95:5 | 95:5 |
| Example 4 | 90:10 | 95:5 | 100:0 |
| Example 5 | 80:20 | 90:10 | 95:5 |
| Example 6 | 80:20 | 90:10 | 100:0 |

TABLE 1-continued

| Composition | Liquid Crystal: Polymer (wt %) | Acrylate: BPD* (wt %) | E-7:CB-15 (wt %) |
|---|---|---|---|
| Example 7 | 80:20 | 95:5 | 95:5 |
| Example 8 | 80:20 | 95:5 | 100:0 |
| C. Example 1 | 90:10 | 100:0 | 100:0 |
| C. Example 2 | 80:20 | 100:0 | 100:0 |

*4,4'-biphenyl diacrylate

TABLE 2

| Properties | Operating Voltage (V) | τd* (msec) | Contrast | Viewing Angle |
|---|---|---|---|---|
| Example 1 | 17 | 26 | 29 | 137 |
| Example 2 | 13 | 17 | 27 | 135 |
| Example 3 | 12 | 21 | 34 | 135 |
| Example 4 | 9 | 30 | 24 | 131 |
| Example 5 | 38 | 9 | 38 | 139 |
| Example 6 | 22 | 12 | 35 | 135 |
| Example 7 | 17 | 34 | 31 | 136 |
| Example 8 | 11 | 31 | 45 | 142 |
| C. Example 1 | 8 | 35 | 33 | 109 |
| C. Example 2 | 10 | 34 | 41 | 114 |

*decaying time

From the results of Examples and Comparative Examples, the use of the polymer system according to the present invention is superior to the use of only acrylate in response time and viewing angle though the operating voltage increases slightly. Therefore, the light modulating liquid crystal material in accordance with the present invention is capable of providing a wider viewing angle and an improved visual contrast and does not require orientation treatment. Furthermore, the electrically switched liquid crystal display including it therein makes use of light more efficiently because polarizer is no longer necessary, and may be produced by a simple process due to the removal of orientation (rubbing) treatment.

I claim:

1. A polymer dispersed liquid crystal formed between a pair of spaced substrates with transparent electrodes, which comprises about 5 to about 40% by weight of liquid crystal mixture and about 60 to about 95 % by weight of polymer, the polymer comprising about 1 to about 40% by weight of oligomer and monomer having an acrylate group, and about 0.1 to about 20% by weight of monomer of the structural formula (I), and the liquid crystal mixture comprising about 0 to about 20% by weight of cholesteric liquid crystal and about 50 to about 98% by weight of nematic liquid crystal as based on the total weight, wherein said structural formula (I) is

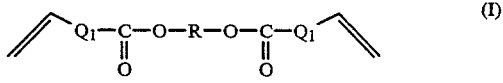

wherein $Q_1$ is selected from the group consisting of

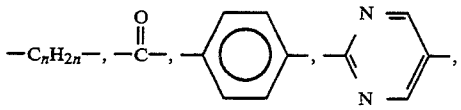

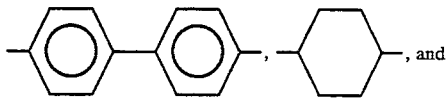

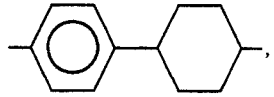

wherein
R is selected from the group consisting of

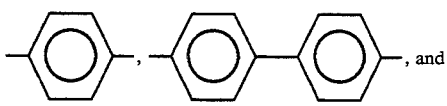

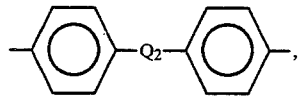

wherein $Q_2$ is selected from the group consisting of

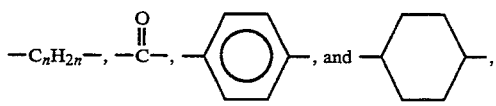

wherein n is an integer of 1 to 10.

2. A polymer dispersed liquid crystal of claim 1, wherein a ratio of the oligomer and monomer having an acrylate group to the monomer of the above structural formula (I) is in a range of about 99:1 to about 80:20 by weight.

3. A polymer dispersed liquid crystal of claim 1, requiring no orientation treatment.

* * * * *

UNITED STATES PATENT AND TRADEMARK OFFICE
CERTIFICATE OF CORRECTION

PATENT NO. : 5,401,437
DATED : March 28, 1995
INVENTOR(S) : Seoung J. Im

It is certified that error appears in the above-indentified patent and that said Letters Patent is hereby corrected as shown below:

Column 3, line 1: Delete "carded out" and insert --carried out--.

Column 6, line 10: Delete "the mount" and insert --the amount--.

Signed and Sealed this

Twentieth Day of June, 1995

*Attest:*

BRUCE LEHMAN

*Attesting Officer*      *Commissioner of Patents and Trademarks*